April 6, 1948. H. E. HASENZAHL 2,439,000
SNAP FASTENER
Filed Aug. 5, 1944
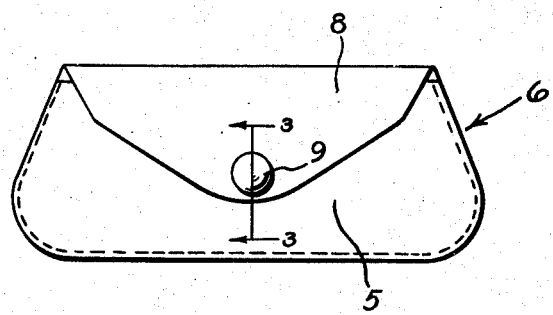
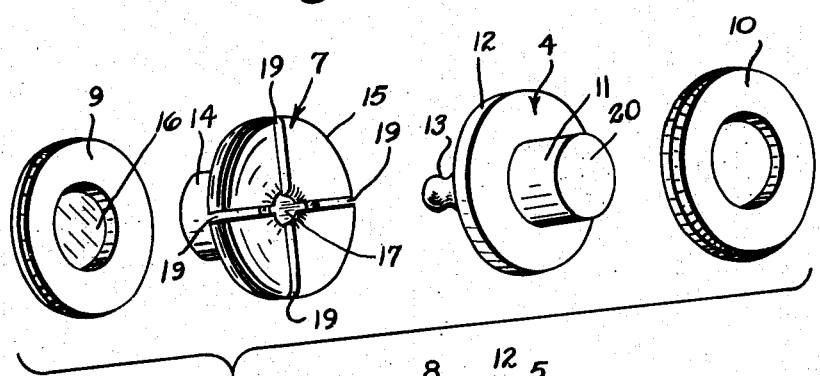
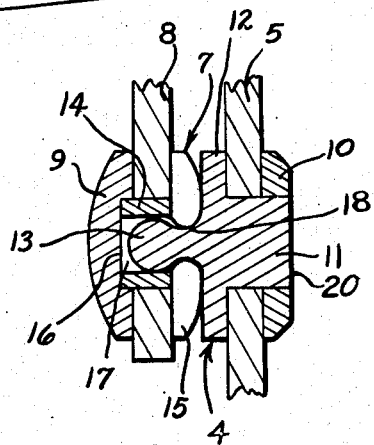
INVENTOR
HERBERT E. HASENZAHL
BY Louis L. Gagnon
ATTORNEY Patented Apr. 6, 1948

2,439,000

UNITED STATES PATENT OFFICE 2,439,000

SNAP FASTENER

Herbert E. Hasenzahl, Southbridge, Mass., assignor to American Optical Company, Southbridge, Mass., a voluntary association of Massachusetts Application August 5, 1944, Serial No. 548,165

4 Claims. (Cl. 24—217)

This invention relates to an improvement in the design of snap fasteners, with particular reference to a novel construction permitting the use of plastic materials.

One of the principal objects of the invention is to provide a simple, easily fabricated snap fastener which may be quickly and easily assembled with the article with which it is to be used.

Another object of the invention is to provide a simple design for said snap fastener which will permit the use of a plastic material in its construction.

Another object of the invention is to provide a design for a snap fastener, whereby metal parts will be completely eliminated.

Another object of the invention is to provide a snap fastener of a plastic material which will be strong and durable.

Other objects and advantages of the invention will become apparent from the following description taken in connection with the accompanying drawings. It will be apparent that many changes may be made in the details of construction, arrangement of parts and methods shown and described without departing from the spirit of the invention as expressed in the accompanying claims. I, therefore do not wish to be limited to the exact details of construction, arrangement of parts and methods shown and described, as the preferred forms only have been given by way of illustration.

Snap fasteners for use in holding together two pieces of flexible materials such as cloth, fabrics, leather, rubber etc. and more particularly for closing the flaps of various types of flexible cases are not new in the art. In the past, however, such devices have been designed to be constructed of metal.

Recent developments have made it increasingly difficult to obtain metal for uses of this nature, whereas developments in the field of plastics have made available new plastic materials, which by means of changes in design can be substituted for metal in the construction of snap fasteners.

Developments in the manufacture of plastics have made it possible to fabricate small parts of plastic materials rapidly and economically.

It is therefore the principal object of this invention to provide a simple design of a snap fastener which may be easily fabricated of plastic materials and which may be quickly and easily assembled with the article with which it is to be used.

Referring to the drawings:

Fig. 1 is a plan view of the snap fastener shown in assembled relation with a flexible spectacle case.

Fig. 2 is an exploded perspective view of the separate parts which make up the invention.

Fig. 3 is a fragmentary sectional view taken on line 3—3 of Fig. 1, and looking in the direction indicated by the arrows.

Referring more particularly to the drawings wherein like characters of reference designate like parts throughout the several views, the device embodying the invention is comprised broadly of four separate parts, namely, the male part 4 which is adapted to be attached to the body portion 5 of a spectacle case or the like 6, a female part 7 which is adapted to be attached to the flap portion 8 of the spectacle case 6, and a cap member 9 and a collar member 10 which are adapted to be used for securing the male member 4 and female member 7 to the spectacle case 6.

The male member 4 is provided with a cylindrical portion 11 which is adapted to extend through the material of the body portion 5 of the spectacle case 6, and has a flange 12 in spaced relation with the end 20 of the cylindrical portion which is adapted to overlie a side surface of the body portion 5. The cylindrical portion 11 will extend through and beyond the opposed surface of the material and is adapted to receive the collar 10, which will overlie the opposed surface of the material and when secured by cement or the like to the cylindrical portion will securely clamp the material between the flange 12 and the collar 10.

The male member 4 is provided with a bulblike connecting portion 13, extending from the flange 12 in opposed relation to the cylindrical portion 11.

The female part 7 has a cylindrical portion 14 which is adapted to extend through the material of the flap 8, and is provided with a flange 15 which will overlie a side surface thereof. The cylindrical portion 14 will extend through and beyond the opposed surface of the material to receive the cap member 9. The cap member 9 is provided with a hole 16 extending part way through, in which that part of the cylindrical portion that extends through the material may be seated, the parts are then secured together by means of cement or the like. The material of the flap will thus be held securely between the cap member 9 and the flange 15 of the female part.

The female part 7 is provided with a hollow bore 17 and an inwardly extending bead 18 about the inner circumferential edge of the bore at the flange end thereof.

The flange 15 is provided with four slots 19 equally spaced about its circumference and extending inwardly to the hollow bore 17. The slots 19 are adapted to be cut through the flange 15 only. This permits the flange 15 of the female part 7 to expand enough to permit the bulb-like portion 13 of the male part 4 to be inserted into the hollow bore 17 when the male and female parts are to be connected. This is necessary because of the fact that the diameter of the bulb-like portion 13 is greater than the diameter of the hollow bore 17 at the flange end thereof, due to the circumferential bead 18 extending inwardly of the bore. It will thus be seen that through the resiliency of the material, that the bulb-like portion 13 of the male part 4 may be received and held securely within the hollow bore 17 of the female part 7, when the spectacle case or the like is to be closed.

It is to be understood that the various parts 4, 7, 9 and 10 are formed of a plastic material such as cellulose acetate, cellulose nitrate, artificial resins or the like and may be machined to the shapes desired or injection molded to said shapes depending upon the nature of the materials used. It is particularly pointed out that the materials must be such as to permit their being adhesively united. The said parts may also be heated to cause the contiguous surface thereof to unite with an integral bond. Suitable solvents may also be used.

From the foregoing description, it will be seen that this invention embodies a simple design, capable of being fabricated out of plastic materials, which may be easily and economically manufactured and assembled.

Having described my invention, I claim:

1. A device of the character described comprising a male fastener element and a female fastener element, said female element being formed of flexible, non-metallic material and comprising a tubular body portion adapted to extend through a perforation formed in the wall of an article with which said device is to be used, said tubular body portion having continuous solid sidewalls and an integral flanged portion of said non-metallic material on one end thereof with a central opening communicating with the bore of the tubular body portion and having portions adapted to overlie a side surface of the wall of the article when the tubular body portion is positioned within said perforation, the opening in said flanged portion being of a diameter less than that of the bore of the tubular body portion and less than the diameter of the male fastener element to be used therewith, said flanged portion having a plurality of spaced radially disposed slots extending from said opening outwardly through said flanged portion to the peripheral edge thereof and with the depth of said slots being confined to the thickness of said flanged portion whereby the flexibility of the material of the flanged portion intermediate said radially disposed slots will permit the diameter of the central opening of said flanged portion to be expanded sufficiently to receive the male fastener element and to firmly clasp and maintain the male fastener element therein, the sidewalls of said body portion being uninterrupted by said slots.

2. A device of the character described comprising a male fastener element and a female fastener element, said female element being formed of flexible, non-metallic material and comprising a tubular body portion of a length sufficient to extend through a perforation formed in the wall of an article with which said device is to be used, said tubular body portion having continuous solid sidewalls and an integral flanged portion of non-metallic material at one end thereof, the flanged portion having a central opening communicating with the bore of the tubular body portion and being adapted to overlyingly engage a side surface of the wall of the article when the tubular body portion is positioned within the perforation, said opening in the flanged portion being of a diameter less than that of the bore of the tubular body portion and less than that of the male fastener element to be used therewith, said flanged portion having a plurality of spaced radially disposed slots extending from said opening outwardly through said flanged portion to the peripheral edge thereof and with the depth of said slots being confined to the thickness of said flanged portion whereby the flexibility of the material of the flanged portion intermediate said radially disposed slots will permit the diameter of the central opening of said flanged portion to be expanded sufficiently to receive the male fastener element, the sidewalls of the body portion being uninterrupted by said slots, and a cap member of non-metallic material adapted to be secured to the opposed end of the body portion and to overlyingly engage the opposed side surface of the wall of the article.

3. A device of the character described comprising a male fastener element and a female element, said female element being formed of flexible, non-metallic material and comprising a tubular body portion extending through a perforation formed in the wall of an article, said tubular body portion being of such an external dimension as to substantially fill said perforation in the wall, said body portion having continuous solid sidewalls and an integral flanged portion of non-metallic material at one end thereof and a cap member secured to the opposed end thereof, said flanged portion and cap member having inner surface portions in engagement with adjacent opposed side surfaces of the wall of the article, said flanged portion being formed with a central opening communicating with the bore of the tubular body portion, and with said opening being of a diameter less than that of the bore of the tubular body portion and less than that of the male fastener element to be used therewith, said flanged portion having a plurality of spaced radially disposed slots extending from said opening outwardly through said flanged portion to the peripheral edge thereof and with the depth of said slots being limited to the thickness of said flanged portion whereby the flexibility of the non-metallic material of the flanged portion intermediate said radially disposed slots will permit the diameter of the central opening of said flanged portion to be expanded sufficiently to receive the male fastener element, the sidewalls of the body portion being uninterrupted by said slots.

4. A device of the character described comprising a male fastener element and a female fastener element, said female element being formed of flexible, non-metallic material and comprising a tubular body portion extending through a perforation formed in the wall of an article with which said device is to be used, said tubular body portion being of such a width as to substantially fill said perforation in the wall, said body portion having continuous solid sidewalls and an integral flanged portion of non-metallic material on one end thereof, said flanged portion having a central opening communicating with the bore of the tubular body portion and having portions in overlying engagement with a side surface of the wall of the article, the opening in said flanged portion being of a diameter less than that of the bore of the tubular body portion and less than that of the male fastener element to be used therewith, said flanged portion having a plurality of spaced radially disposed slots extending from said opening outwardly through said flanged portion with the depth thereof being limited to the thickness of said flanged portion whereby the flexibility of the flanged portion intermediate said radially disposed slots will permit the diameter of the central opening of said flanged portion to be expanded sufficiently to receive the male fastener element and to cause the walls of the opening in said flanged portion to firmly clasp and retain the male fastener element therein, the sidewalls of said body portion being uninterrupted by said slots, said tubular body portion being of a length sufficient to extend through the wall of the article, and a cap member of non-metallic material integrally secured to the opposed end of said tubular body portion through the co-mingling of the materials of the cap member and body portion, said cap member having portions in overlying engagement with the other side surface of the wall.

HERBERT E. HASENZAHL.

REFERENCES CITED

The following references are of record in the file of this patent:

UNITED STATES PATENTS

| Number | Name | Date |
| --- | --- | --- |
| 374,609 | Mandrill | Dec. 13, 1887 |
| 383,070 | Richardson | May 15, 1888 |
| 707,504 | Dowse | Aug. 19, 1902 |
| 749,639 | Sternberg | Jan. 12, 1904 |
| 756,184 | Richardson | Mar. 29, 1904 |
| 2,189,995 | Reiter | Feb. 13, 1940 |